United States Patent [19]

Schabert et al.

[11] 4,092,490
[45] May 30, 1978

[54] NUCLEAR REACTOR PLANT

[75] Inventors: Hans-Peter Schabert; Rolf Drossel, both of Erlangen, Germany

[73] Assignee: Kraftwerk Union Aktiengesellschaft, Mülheim an der Ruhr, Germany

[21] Appl. No.: 700,910

[22] Filed: Jun. 29, 1976

[30] Foreign Application Priority Data

Jul. 11, 1975 Germany ............................. 2531168

[51] Int. Cl.² .............................................. G21C 9/00
[52] U.S. Cl. ........................................ 176/38; 176/87
[58] Field of Search ................. 176/87, 37, 38, 50, 176/61, 64, 65

[56] References Cited

U.S. PATENT DOCUMENTS

| 3,748,228 | 7/1973 | Zimmermann | 176/60 |
| 3,818,935 | 6/1974 | Karker et al. | 137/590 |
| 3,953,289 | 4/1976 | Costes | 176/87 |

FOREIGN PATENT DOCUMENTS 2,345,580  5/1975  Germany ............................. 176/38

Primary Examiner—Samuel W. Engle
Assistant Examiner—Ralph Palo
Attorney, Agent, or Firm—Herbert L. Lerner

[57] ABSTRACT

A nuclear reactor plant has a containment shell, a secondary shield enclosing the containment shell and defining therewith an annular space therebetween and a double pipe of a live steam or feedwater line passing through the annular space and formed of a pair of inner and outer pipe portions defining an annular space therebetween. A support member supports an end of the double pipe in vicinity of the secondary shield, the support member having a substantially conical outer surface and being formed with an annular recess communicating with and terminating the annular space formed in the double pipe. Also provided are means for supporting the other end of the double pipe in the containment shell while affording longitudinal movement of the other end of the double pipe.

10 Claims, 3 Drawing Figures

NUCLEAR REACTOR PLANT

The invention relates to a nuclear reactor plant with a containment shell, a secondary shield enclosing the containment shell and defining therewith an annular space therebetween, through which a double pipe of a live steam or feedwater line passes.

From the German Published Nonprosecuted Application No. DT-OS 23 06 582, which is concerned with a concrete reactor pressure vessel for a boiling water reactor, it is known that the double pipe extending through the wall of the reactor pressure vessel can be secured by conical bodies which are disposed in the gap between the inner and the outer pipe. The outer pipe is fastened directly in the concrete. This is possible because the concrete, as part of the reactor pressure vessel, has relatively high temperatures. For this reason, the differences in temperature between the live steam line and the reactor pressure vessel are relatively small and the thermal expansions associated therewith are controllable in the applicable lengths of the line.

With the invention of the instant application, however, while the live steam or feedwater line must be reliably secured in the region of the annular space between the containment shell and the secondary shield i.e, at a considerable distance from the reactor pressure vessel, the line cannot be so rigidly clamped, on the other hand, as in the case of the reactor pressure vessel according to the hereinaforementioned German published application, due to the large temperature differences and the great lengths, over which such temperature differences become effective. It is therefore necessary to use a support which is, of course, stable or sturdy yet also resilient. Assurance must simultaneously be provided, however, that a break of the live steam or feedwater line will never result in a condition wherein the annular space between the containment shell and the secondary shield will be subjected to high pressure.

It is therefore an object of the invention of the instant application to provide a solid though flexible support for a pipeline passing through the walls of a nuclear reactor plant.

Another object of the invention is to provide a support structure which will avoid breaks in the line and stresses on the walls of the reactor plant.

With the foregoing and other objects in view, there is provided, in accordance with the invention, in a nuclear reactor plant having a containment shell, a secondary shield enclosing the containment shell and defining therewith an annular space therebetween and a double pipe of a live steam or feedwater line passing through the annular space and formed of a pair of inner and outer pipe portions defining an annular space therebetween, a support member supporting an end of the double pipe in vicinity of the secondary shield, the support member having a substantially conical outer surface and being formed with an annular recess communicating with and terminating the annular space formed in the double pipe, and means for supporting the other end of the double pipe in the containment shell while affording longitudinal movement of the other end of the double pipe.

In the invention of the instant application, the double pipe is fastened in the region of the secondary shield. The location at which the fastening occurs may be protected by the concrete of the secondary shield, so that there is no possibility of its being subjected to mechanical stresses from the outside. The substantially conical support member is used as a holder for both the inner as well as the outer pipe. It is therefore firmly connected to both pipes. In addition, the support member closes the annular space between the two pipes, so that no separate device is necessary for this purpose. In this manner, the strength or solidity of the support member can be utilized simultaneously, through an increased wall thickness of the inner pipe in vicinity of the support member, for eliminating the danger of breaks, due to which a leak could lead directly from the live steam line into the annular space.

The longitudinally movable bracing or support of the other or free end of the double pipe serves to relieve the support member. This prevents bending stresses in the support body, which may occur as a result of reaction forces arising from a break in the live steam line within the interior of the containment shell. Movements of the double pipe in longitudinal direction which are caused by thermal expansion are not impeded by the support or bracing means at the inner or other end of the double pipe.

In accordance with another feature of the invention, means comprising a substantially conical sleeve are provided, securing the support member to the secondary shield, the substantially conical shield having a wall thickness decreasing with increasing diameter of the sleeve. The substantially conical sleeve forms a tight closure or seal of the secondary shield, so that a double containment structure is provided. High temperature gradients that cannot be avoided are thus absorbed up by the substantially conical sleeve without excessive thermal stresses.

The decrease in wall thickness of the substantially conical sleeve with increasing diameter provides increased flexibility and simultaneous saving of material.

In accordance with a further feature of the invention, the substantially conical sleeve has a cone angle which increases with increasing diameter of the sleeve. A support member which is thus extended by a substantially conical sleeve flares out like the bell of a trumpet and also has especially great flexibility.

In accordance with added features of the invention, the live steam or feedwater line has a length thereof several times the diameter thereof that is located outside the secondary shield and surrounded by a protective pipe. Where the line is the live steam line, the protective pipe is constructed so as to withstand full operating pressure of the live steam line. The protective pipe further limits the forces acting upon the support member, since it eliminates bending moments that might otherwise occur in the event of a hypothetical break of the live steam line outside the secondary shield.

In accordance with an additional feature of the invention, a pair of double, substantially conical sleeves are provided supporting the double pipe at the containment shell. The support can also, however, be located in the interior of the containment shell so that the lever arm serving to absorb the forces is even longer. For example, in accordance with yet another feature of the invention, the means for supporting the other end of the double pipe comprises a concrete wall which is connected to a concrete cylinder enclosing the steam generator of the nuclear reactor plant. The concrete cylinder structure, which is generally very strong mechanically, can then be used for fixing the live steam line.

In accordance with an alternate feature of the invention, the means for supporting the other end of the double pipe comprises a metal framework such as a steel framework.

In accordance with concomitant features of the invention, compensating means are included for movably sealing the movable end of the double pipe. In the illustrated embodiment such compensating means comprise a tubular member of bellows-like construction. In this manner, an expansible and contractible compensating device serves as a closure or seal for preventing possible entry of contaminated steam into the double pipe.

Other features which are considered as characteristic for the invention are set forth in the appended claims.

Although the invention is illustrated and described herein as embodied in a nuclear reactor plant, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings wherein.

Figure 1:
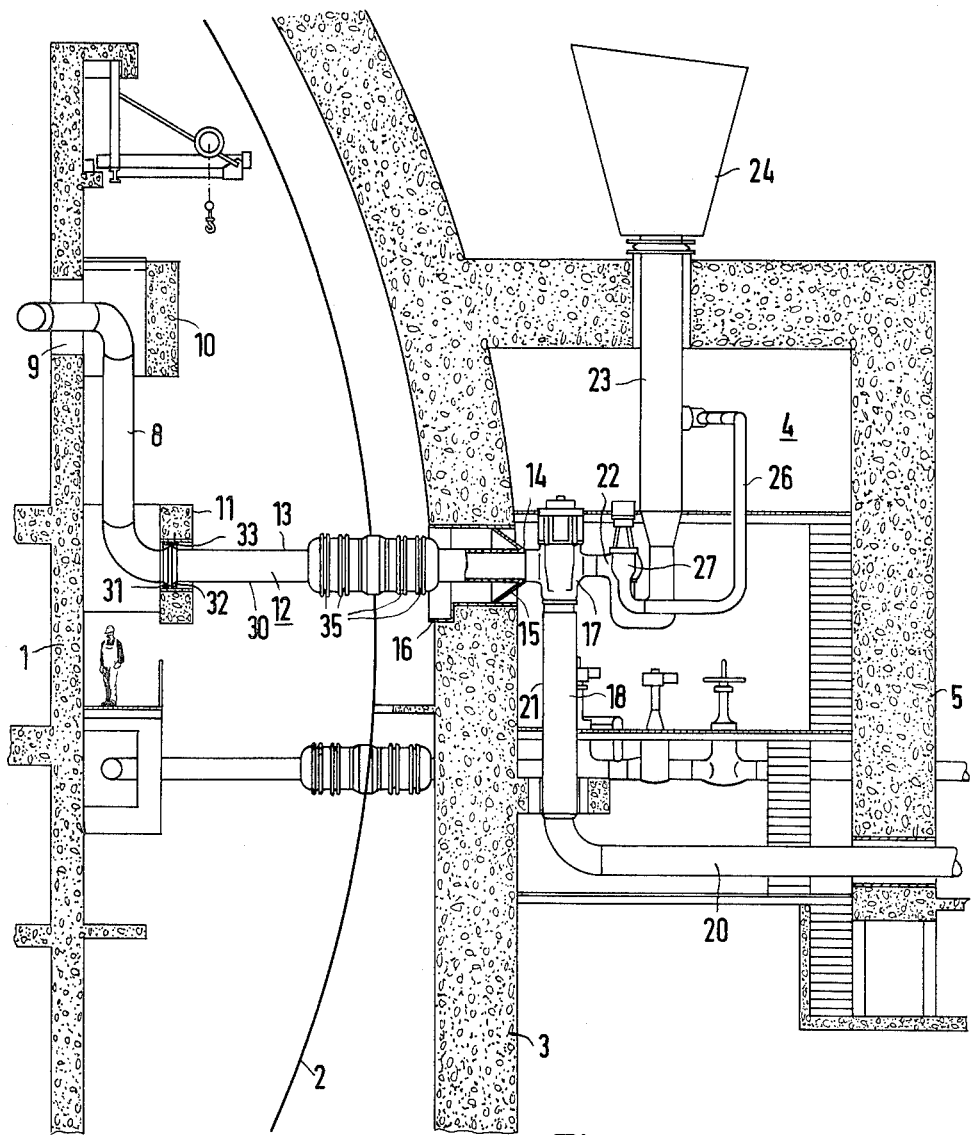
FIG. 1 is a fragmentary vertical sectional view of a nuclear power plant producing, for example, 1300 MWe with a pressurized water reactor.

Referring now to the drawing and first, particularly, to FIG. 1 thereof, there are shown, in accordance with the invention, the nuclear components of the nuclear reactor plant i.e. the reactor pressure vessel and the primary coolant loop with steam generators, disposed in the interior of a concrete cylinder 1, which, in turn, tightly surrounded by a steel containment shell 2 constructed in the form of a sphere. A secondary shielding 3 serves as an outer protection for the containment shell 2. The secondary shield 3 is a concrete structure which has an outer valve chamber 4 enclosed by a mechanically-strong concrete projection 5.

A live steam line 8, which passes through an opening 9 formed in the concrete cylinder 1, comes from the non-illustrated steam generators. The opening 9 is covered on the outside thereof by a concrete bracket 10. A similar concrete bracket 11, which is located below the bracket 10, supports the horizontal section of the live steam line, generally designated by the reference numeral 12, which passes through the containment shell 2 and the secondary shield 3. This horizontal section of the line 12 is constructed as a double or double-wall pipe 13 which terminates or is closed by a support member 14 in vicinity of the secondary shield 3. The support member 14 is fastened by means of a substantially conical sleeve 15 in a wall or masonry tube or pipe 16 which surrounds the double pipe 13 with wide clearance and therefore affords inspection of the live steam line. A shut-off valve 17 is secured to the support member and serves as an elbow in the live steam line and has a vertical outlet section 18, as viewed in FIG. 1. A Further section 20 of the live steam line then runs in horizontal direction to a non-illustrated turbine. The vertical section 18 is surrounded by a protective pipe 21.

A safety valve 22 is secured to the housing of the valve 17 and has an outlet section 23 extending out of the concrete wall 5 and is terminated above the latter by a sound absorber or muffler 24. A line 26, which is fed through blowdown control valves 27, also extends into the outlet section 23.

As noted hereinbefore, the live steam line 12 is supported in the concrete bracket 11. At that location, the outer pipe 30 is held at the free end thereof by a member, formed of two double, substantially conical sleeves or shells 31 and 32, which is slidable in the concrete bracket 11 on a ring 33. The required flexibility relative to the shell 2, through which the outer pipe 20 tightly or sealingly extends, is attained by means of compensators 35.

Figure 2:
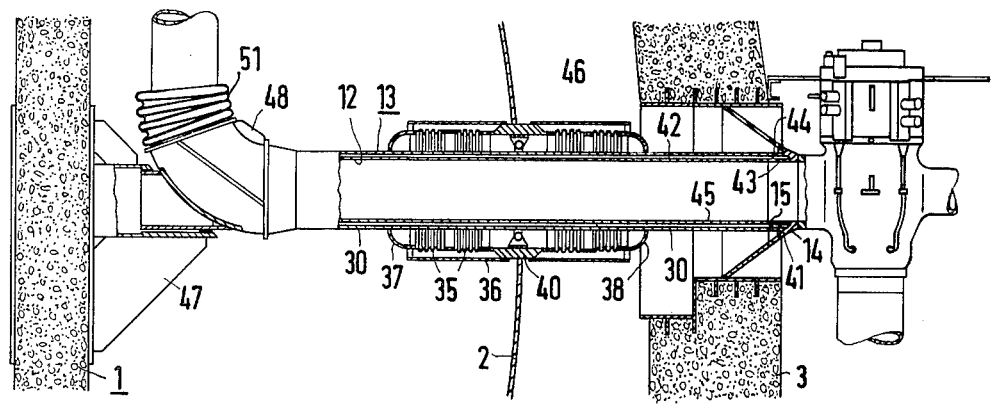
FIG. 2 is an enlarged fragmentary view of FIG. 1 showing another embodiment of the invention.

From FIG. 2, it is readily seen that the compensators 35 are of bellows-like construction and are surrounded by a protective tube or pipe 36. The tube 36 and the compensators 35 are connected through shells or sleeves 37 and 38 to the outer pipe 30 of the double pipe, on the one hand and to a support ring 40, on the other hand. The support ring 40 is welded to the containment shell 2.

It is apparent also from FIG. 2 that the support member 14, which is in the form of a forging, is provided with an annular recess or incision 41 which closes or terminates the annular space 42 of the double pipe. Thus, the two parts 43 and 44 of the support member 14, which are separated by the annular recess 41, are connected, respectively, to the inner pipe 45 and the outer pipe 30.

FIG. 2 further shows that the radially inner part of the substantially conical support member 14 has a substantially greater wall thickness in the region wherein the double pipe is terminated or closed by the annular recess 41, than is provided for the inner pipe 45 and the region 43 of the support member 14. It is therefore virtually impossible for a break of the live steam line to occur which could place the annular space 46, located between the containment shell 2 and the secondary shielding 3, under pressure.

In the embodiment shown in FIG. 2, the end of the double pipe facing away from the support member 14 is fastened in a steel or other metal framework or bracket 47 which is secured to the concrete cylinder 1. This steel framework 47 extends around a ribbed member 48 in which the outer pipe 30 of the double pipe is supported to afford movement thereof in longitudinal direction of the pipe section 12. The intermediate annular space 42 between the inner and outer pipes at this end is terminated or closed by a compensator 51 of bellows-like construction.

Figure 3:
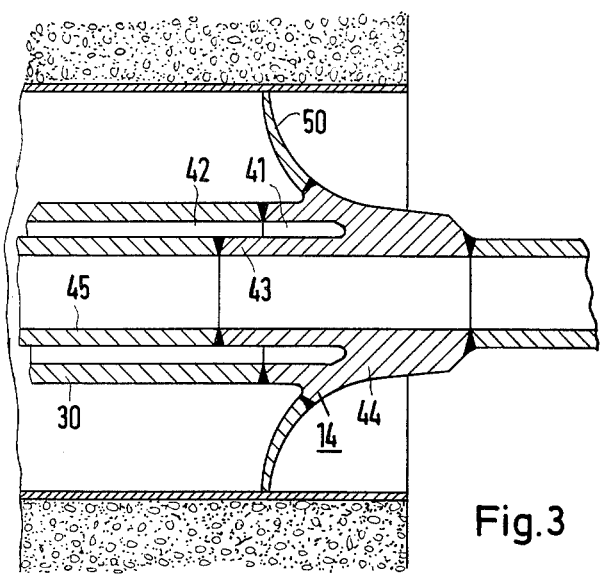
FIG. 3 is an enlarged fragmentary view of a modified form of the support member of FIG. 2.

In FIG. 3, yet another embodiment of the support member 14 is shown, including a part constructed as a substantially conical sleeve or shell 50 that is formed with varying wall thickness. As shown, the wall thickness of the substantially conical sleeve 50 decreases with increasing diameter. The substantially conical sleeve 50 is accordingly analogous to a beam subjected to constant bending stress. In addition, the cone angle of the conical sleeve 50 increases with increasing daimeter. This occurs continuously in the embodiment of FIG. 3. However, the increase in the cone angle can occur stepwise, so that the region of the conical sleeve may be formed, for example, of a series of individual rings of respectively increasing diameter that are axially connected one to another.

What is claimed is:

1. In a nuclear reactor plant having a containment shell, a secondary shield enclosing the containment shell and defining therewith an annular space therebetween, and a double pipe of a live steam or feedwater line passing through an opening formed in the containment shell and through the annular space into a passage formed in the secondary shield, the double pipe being formed of a pair of inner and outer pipe portions defining an annular space therebetween, and means for securely supporting said double pipe comprising a support member disposed within the passage of the secondary shield for supporting an end of the double pipe therewithin, said support member having a substantially conical outer surface and being formed with an annular recess communicating with and terminating the annular space formed in the double pipe, and means for supporting the other end of the double pipe as it passes through the opening formed in the containment shell while affording longitudinal movement of said other end of the double pipe.

2. In a nuclear reactor plant according to claim 1, means comprising a substantially conical sleeve securing said support member to said secondary shield, said substantially conical sleeve having a wall thickness decreasing with increasing diameter of said sleeve.

3. In a nuclear reactor plant according to claim 2 wherein said substantially conical sleeve has a cone angle which increases with increasing diameter, of the sleeve.

4. In a nuclear reactor plant according to claim 1 wherein the line has a length thereof several times the diameter thereof located outside the secondary shield and surrounded by a protective pipe.

5. In a nuclear reactor plant according to claim 4 wherein the line is the live stream line, and said protective pipe is constructed so as to withstand full operating pressure of the live steam line.

6. In a nuclear reactor plant according to claim 1 including a pair of double, substantially conical sleeves supporting said double pipe at the containment shell.

7. In a nuclear reactor plant according to claim 1 including a steam generator and a concrete cylinder enclosing the steam generator and spaced inwardly from the containment shell, said means for supporting the other end of the double pipe comprises a concrete wall connected to the concrete cylinder.

8. In a nuclear reactor plant according to claim 1 wherein said means for supporting the other end of the double pipe comprises a metal framework.

9. In a nuclear reactor plant according to claim 1 including compensating means for movably sealing the movable end of the double pipe.

10. In a nuclear reactor plant according to claim 9 wherein said compensating means comprise a tubular member of bellows-like construction.

* * * * *